United States Patent Office.

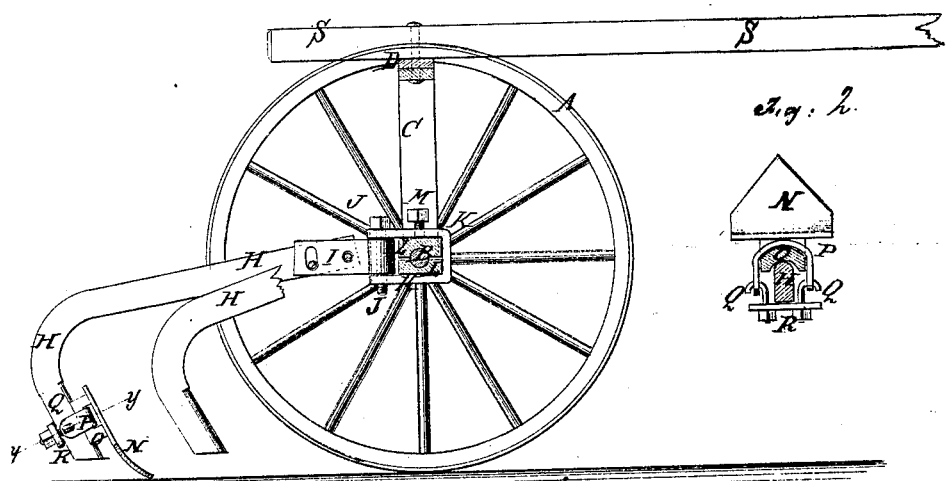
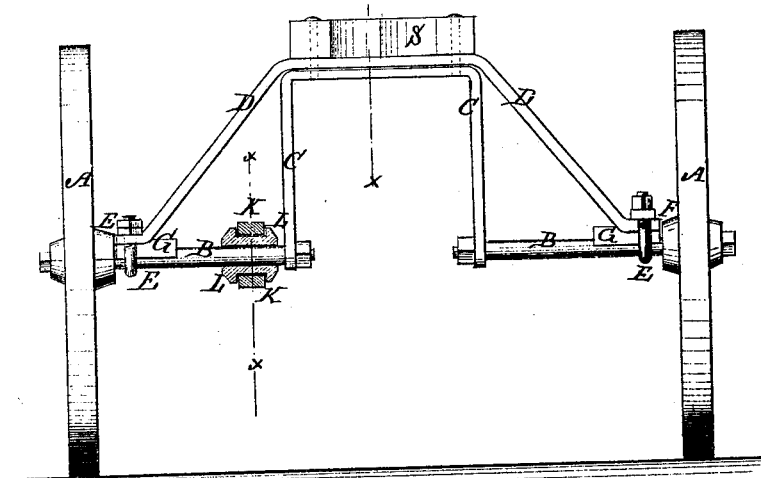

MARSHALL SATTLEY, OF TAYLORVILLE, ILLINOIS.

Letters Patent No. 111,781, dated February 14, 1871.

IMPROVEMENT IN CULTIVATORS.

The Schedule referred to in these Letters Patent and making part of the same.

*To all whom it may concern:*

Be it known that I, MARSHALL SATTLEY, of Taylorville, in the county of Christian and State of Illinois, have invented a new and useful Improvement in Cultivators; and I do hereby declare that the following is a full, clear, and exact description thereof, which will enable others skilled in the art to make and use the same, reference being had to the accompanying drawing forming part of this specification.

Figure 1 is a detail sectional view of my improved cultivator, taken through the line $x\ x$, fig. 2.

Figure 2 is a rear view of the same partly in section, to show the construction.

Figure 3 is a detail sectional view of the same, taken through the line $y\ y$, fig. 1.

Similar letters of reference indicate corresponding parts.

My invention relates to cultivators, and consists in the mode of combining the frame and axles, as hereinafter more particularly described and subsequently exemplified in the claim.

A are the wheels of the cultivator, which revolve upon and are secured to the journals of the axles B in the ordinary manner.

C is a bar, which is bent twice at right angles or nearly at right angles, and the ends of which are securely attached to the inner ends of the axles B, thus forming a space beneath the body of the cultivator, to enable it to pass over the plants being cultivated without injuring them.

D is a bar, which is bent twice at an obtuse angle, so that, while its middle or horizontal part may rest upon the horizontal middle part of the bar B, the ends of the bar D may reach the axles B near the wheels A and be secured to said axles by a clip, E, and yoke F, a block, G, being interposed between the said axles and the ends of the said bar D, if desired.

S is the tongue, which may be secured to the horizontal parts of the bars C D by the same bolts that secure the said parts of the said bars to each other.

H are the plow-beams, two of which are connected with each axle B.

The beams of each pair are made of different lengths, so that one of the plows may work in advance of the other.

The forward ends of the beams of each pair are placed one upon each side of the bar I, to which they are secured by two bolts, the rear bolt passing through a slot in the rear part of the said bar, as shown in fig. 1, so that, by loosening the said rear bolt, the plows may be adjusted to work deeper or shallower in the ground, as may be desired.

In the forward ends of the short bars I is formed an eye, through which passes the bolt J, which also passes through the rear ends of the clip K, so as to allow the plows to have a free lateral movement, while, at the same time, they are always held in an erect position.

L are boxes, each of which is made in two parts, placed one above and the other below the axle B, the concaves or recesses of said boxes being made so shallow that the ends of said parts will not touch each other, as shown in fig. 1.

The boxes L are secured to the axles B by the clips or bands K, as shown in figs. 1 and 2.

M is a set-screw that passes through the upper part or arm of the clips or straps K, and the forward end of which rests against the upper part or half of the said boxes L, so that, by turning the said screw M, the wear of the boxes may be taken up, causing the said boxes to always fit snugly upon the said axle. This construction allows the plows to have a free vertical movement.

The rear ends of the beams H are bent downward and the forward edges of their lower ends are rounded off, the rear edges being left square, as shown in figs. 1 and 3.

N are the plows, upon the rear sides of which are formed eyes, O, having their rear sides concaved to fit upon the rounded forward edge of the lower ends of the plow-beams H, and having their forward sides convex or rounded to receive the clips P, the ends of the arms of which have holes or eyes formed in them to receive the hooks of the hook-bolts Q which pass through the holes of the yoke R and are secured by nuts.

This construction enables the plows N to be adjusted squarely upon their seats, or inclined to throw the soil to the right or left or toward or from the plants, as may be desired.

Having thus described my invention,

I claim as new and desire to secure by Letters Patent—

The axles B B, each extending out about one-third the distance between the hubs of the wheels, combined as described, with a right-angled bar, C C, and obtuse-angled bar, D D, the former fastened to said axles at the outer part and the latter at the inner part near the hub, all as and for the purpose set forth.

MARSHALL SATTLEY.

Witnesses:
JAMES M. TAYLOR,
JOHN B. JONES,
ALBERT SATTLEY.